(12) United States Patent
Hara

(10) Patent No.: US 11,290,604 B2
(45) Date of Patent: Mar. 29, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenji Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/125,764

(22) Filed: Dec. 17, 2020

(65) Prior Publication Data

US 2021/0203794 A1 Jul. 1, 2021

(30) Foreign Application Priority Data

Dec. 25, 2019 (JP) .............................. JP2019-235090

(51) Int. Cl.
*H04N 1/00* (2006.01)
(52) U.S. Cl.
CPC ..... *H04N 1/00411* (2013.01); *H04N 1/00204* (2013.01); *H04N 1/00474* (2013.01); *H04N 1/00482* (2013.01); *H04N 2201/0081* (2013.01); *H04N 2201/0094* (2013.01)
(58) Field of Classification Search
CPC .... G06F 16/972; G06F 3/1207; G06F 3/1259; H04N 1/00225; H04N 1/00233; H04N 1/32106; H04N 2201/0018; H04N 2201/0094; H04N 2201/0098; H04N 2201/3212; H04N 2201/3225; H04N 2201/3226; H04N 2201/3273; H04N 2201/3278; H04N 1/0041; H04N 1/00474; H04N 2201/0061

USPC ......................................................... 358/1.1
See application file for complete search history.

(56) References Cited

U.S. PATENT DOCUMENTS

| 7,031,003 | B2 * | 4/2006 | Nagai | H04N 1/00408 |
| | | | | 358/1.12 |
| 8,446,616 | B2 * | 5/2013 | Kashioka | H04N 1/00458 |
| | | | | 358/1.15 |
| 2006/0101344 | A1 * | 5/2006 | Tabata | H04N 1/00474 |
| | | | | 715/761 |
| 2006/0132821 | A1 * | 6/2006 | Nonaka | H04N 1/00127 |
| | | | | 358/1.13 |
| 2007/0046995 | A1 | 3/2007 | Toda | |
| 2007/0297017 | A1 * | 12/2007 | Kashioka | H04N 1/00474 |
| | | | | 358/448 |

(Continued)

FOREIGN PATENT DOCUMENTS

JP 2009-010818 A 1/2009

*Primary Examiner* — Negussie Worku
(74) *Attorney, Agent, or Firm* — Canon U.S.A., Inc. IP Division

(57) ABSTRACT

The present invention is directed to reduction of a time from setting of a job to execution of an output job including execution of scanning at the time of performing scanning. An image processing apparatus according to the present invention includes a reading unit configured to perform reading processing to read an image of a document and to generate image data based on the image, and a reception unit configured to receive a selection of a job, the job performing output processing based on the image data generated by the reading processing. The reception unit receives the selection of the job while the reading unit performs the reading processing.

19 Claims, 13 Drawing Sheets

(56) References Cited

U.S. PATENT DOCUMENTS

| | | | |
|---|---|---|---|
| 2010/0053695 A1* | 3/2010 | Togami | H04N 1/32486 |
| | | | 358/448 |
| 2011/0085191 A1* | 4/2011 | Takato | H04N 1/00435 |
| | | | 358/1.13 |
| 2012/0212776 A1* | 8/2012 | Murata | G06F 3/1255 |
| | | | 358/1.15 |
| 2014/0168705 A1* | 6/2014 | Matsuda | H04N 1/00225 |
| | | | 358/1.15 |
| 2018/0373480 A1 | 12/2018 | Tsuji | |

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

There has been an image processing apparatus that executes a job when receiving an execution instruction after selection of a type of a job to be processed by the image processing apparatus and setting of the job have been performed via an operation unit of the image processing apparatus (Japanese Patent Application Laid-Open No. 2009-10818).

For example, in a case where a user places a document on a document tray of the image processing apparatus, and the image processing apparatus receives an execution instruction of a job including scanning via an operation unit and executes the job, the image processing apparatus starts scanning after the user sets the job and instructs execution of the job. Thus, the user may need to wait for a long time in front of the image processing apparatus until the execution of the job ends.

SUMMARY OF THE INVENTION

The present invention has been made in view of the above issue, and is directed to reduce a time for executing an output job including job setting and scanning execution while scanning.

An image processing apparatus according to the present invention includes a reading unit configured to perform reading processing to read an image of a document and to generate image data based on the image, and a reception unit configured to receive a selection of a job, the job performing output processing based on the image data generated by the reading processing. The reception unit receives the selection of the job while the reading unit performs the reading processing.

Further features of the present invention will become apparent from the following description of exemplary embodiments with reference to the attached drawings.

DESCRIPTION OF THE EMBODIMENTS

An exemplary embodiment of the present invention is described below with reference to drawings. A configuration illustrated in the following exemplary embodiment is illustrative, and the present invention is not limited to the illustrated configuration.

Figure 1:
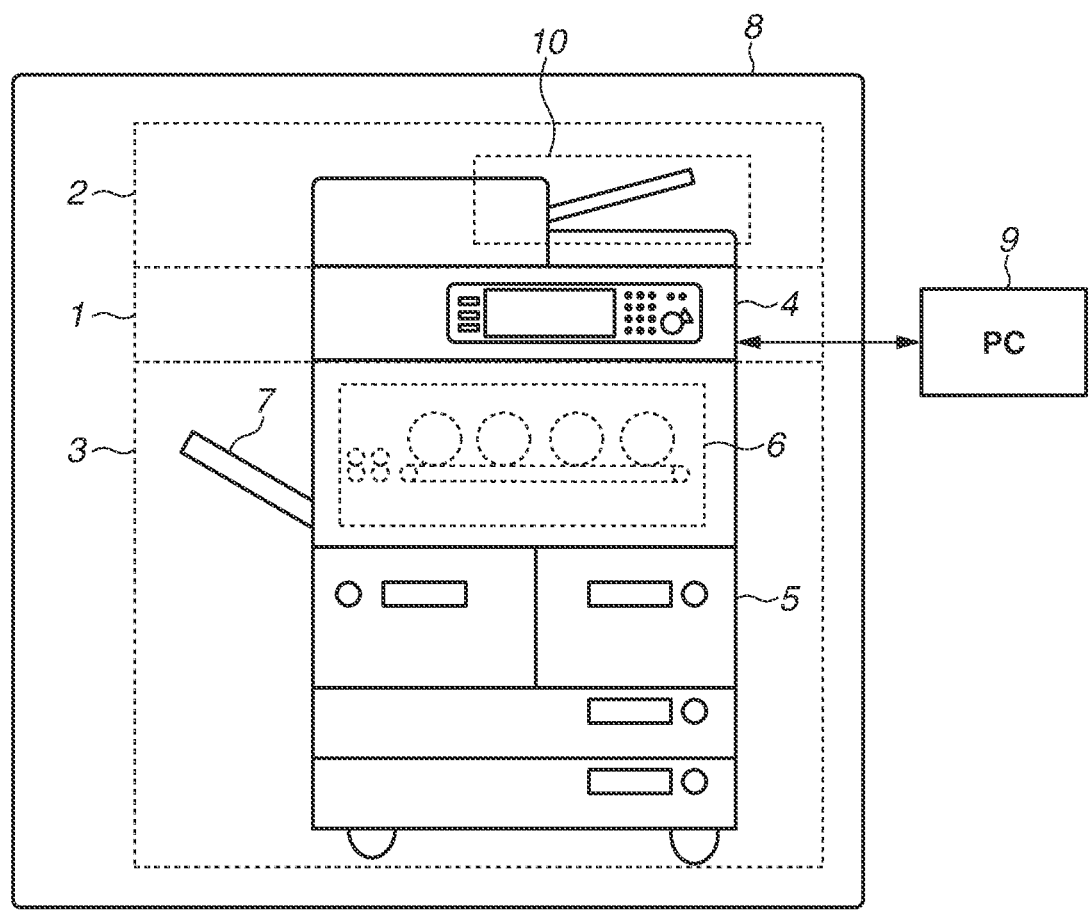
FIG. 1 is a diagram illustrating an example of a system configuration.

FIG. 1 is a diagram illustrating an example of a system configuration. A multifunctional peripheral (MFP) 8 as an image processing apparatus includes a scanner 2, a controller unit 1 controlling the entire MFP 8, and a printer 3. While the present exemplary embodiment is an image processing apparatus, a document reader, an information processing apparatus, or other apparatus is adoptable. The MFP 8 is connected to a personal computer (PC) 9 via a network.

In addition to the scanner 2 a reading engine of the image, the MFP 8 includes the printer 3 an output engine of an image, an operation unit 4, a discharge tray 7, a feeding cassette 5, and an electrophotographic process unit 6. The MFP 8 also includes an automatic document feeder (ADF) 10. When documents are placed on a loading tray a document loading portion and copying operation is instructed from the operation unit 4, the scanner 2 sequentially reads the documents and generates image data. The printer 3 sequentially feeds sheets from the feeding cassette 5. The electrophotographic process unit 6 prints images, on the sheets, based on the generated image data.

When receiving a print job from the PC 9, the printer 3 prints an image, on a sheet, based on image data included in the received print job.

Figure 2:
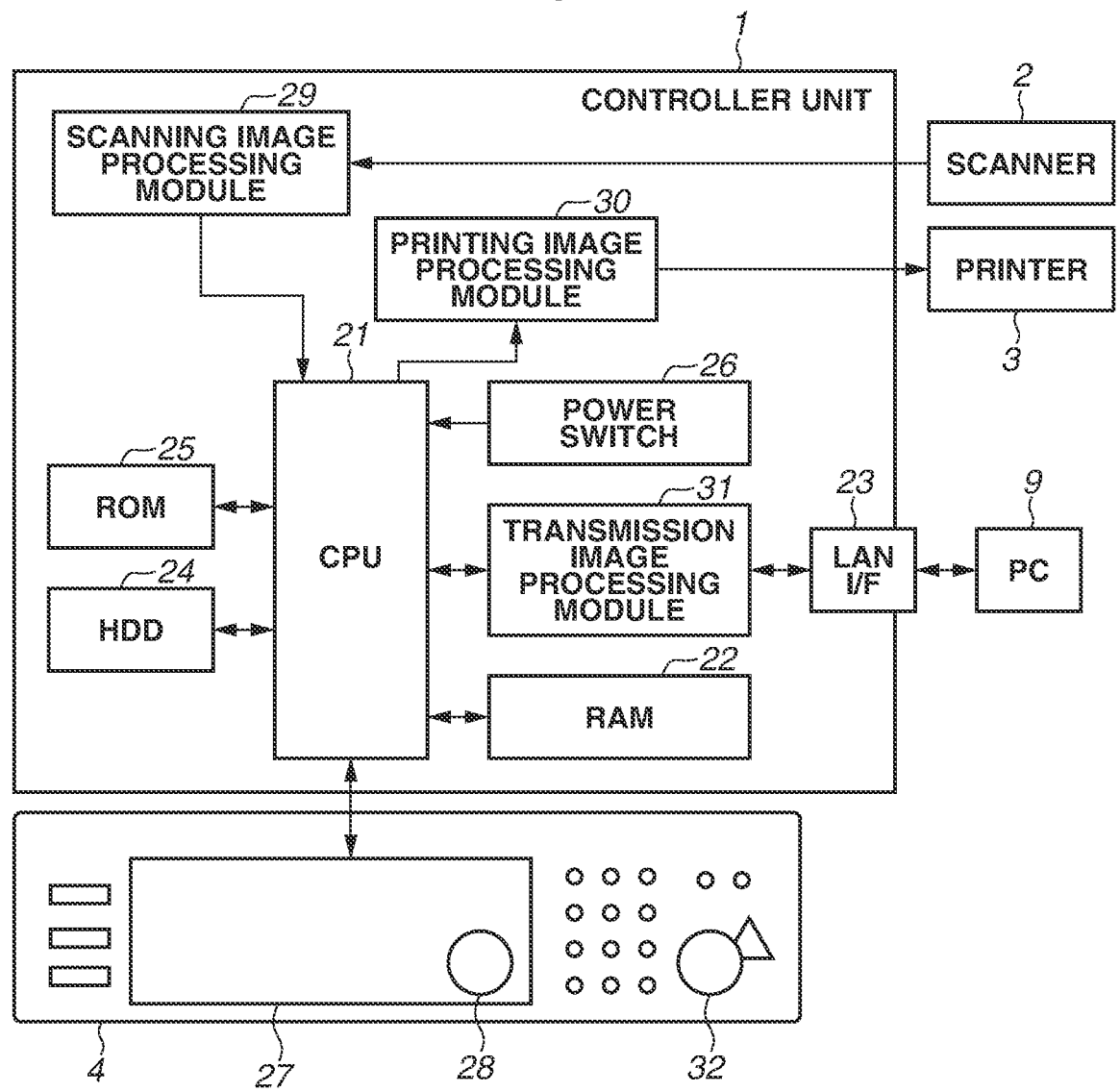
FIG. 2 is a diagram illustrating an example of a hardware configuration of a multifunctional peripheral (MFP).

FIG. 2 is a diagram illustrating an example of a hardware configuration of the MFP 8. The MFP 8 includes, in the controller unit 1, a central processing unit (CPU) 21, a random access memory (RAM) 22, a local area network (LAN) interface (I/F) 23, a hard disk drive (HDD) 24, a read only memory (ROM) 25, and a power switch 26. The MFP 8 includes an image processing module for scanning 29, an image processing module for printing 30, and an image processing module for transmission 31.

When a computer program stored in the ROM 25 is read to the RAM 22 and executed by the CPU 21, various kinds of functions of the MFP 8 are executed.

When the CPU 21 boots up from the ROM 25 and initializes a storage controller, the CPU 21 can access the HDD 24, and thereby activating the MFP 8 to be in a usable state.

The MFP 8 includes the LAN I/F 23, and can communicate with an external apparatus, such as the PC 9, based on a communication scheme such as Ethernet®. In the present exemplary embodiment, an example in which communication with the external apparatus is performed via a wired network, such as Ethernet, is described. However, the LAN I/F 23 may be an I/F connectable to a wireless LAN, and thereby the MFP 8 may communicate with the external apparatus through wireless communication.

The CPU 21 is connected to the operation unit 4 operated by the user, the scanner 2, and the printer 3.

The operation unit 4 includes an operation panel 27 in which a touch panel is bonded to a liquid crystal display (LCD) screen. The operation panel 27 operates as a reception unit receiving user operation and as a display unit displaying a screen. A job start button 32 is a hardware button configured to instruct execution of a job when pressed. A job start button 28 is a software button displayed on the operation panel 27, and can instruct execution of a job.

Copying operation will now be described. A screen is transited to a copy function screen on the operation unit 4, and setting is performed. The setting includes setting about the scanner 2, such as whether to perform copying in color and whether to read both sides. Setting about printing is simultaneously performed. Samples of the setting include whether to perform printing in color, whether to perform printing in double sided, whether to use a stapler, and the number of copies to print.

When the job start button 32 or the job start button 28 is pressed after the setting is received, the CPU 21 instructs the scanner 2 to read a document image. The scanner 2 reads the document image, and the CPU 21 generates image data based on the document image. The generated image data is temporarily stored in the RAM 22, and is then stored in the HDD 24.

When the printer 3 is ready, the image data is read out from the HDD 24 to the RAM 22 and is transmitted to the printer 3. The printer 3 prints an image on a sheet based on the image data. At this time, the image processing module for printing 30 executes image processing to output an excellent image after printing, in consideration of characteristics of the printer 3.

As described above, a copy job is executed by interlocking operation of a scan job (reading processing) and a print job (printing processing). The scan job sequentially stores the scanned image data in the HDD 24. The print job instructs the printer 3 to sequentially print the stored images on the sheets.

Operation of a transmission job will now be described. In the job, the image data generated by reading of the document image is transmitted to the PC 9. Setting of the transmission job is performed via a transmission function screen of the operation unit 4.

The setting includes scanning related setting such as whether to perform scanning in color and whether to read both sides, and image processing and transmission settings, such as destination, resolution, and execution/non-execution of optical character recognition (OCR), performed on the image data generated by scanning.

When the job start button 32 or the job start button 28 is pressed after the setting is received, the CPU 21 instructs the scanner 2 to read a document image. The scanner 2 reads the document image, and the CPU 21 generates image data based on the document image. The generated image data is temporarily stored in the RAM 22, and is then stored in the HDD 24.

In parallel with the scanning processing, the image processing module for transmission 31 converts the image data read out from the HDD 24 to the RAM 22 into a suitable format to be used in the PC 9. The converted image data is temporarily stored in the RAM 22. The CPU 21 transmits the converted image data to the PC 9 vial the LAN I/F 23.

The "copying operation" described above includes the scanning processing and the printing processing. In an existing technique, setting is performed for both the scanning processing and the printing processing before the copy job is started. Thereafter, the scanner 2 starts the scanning operation at timing when the job start button 32 is pressed.

Likewise, the "network transmission job operation" includes the scanning processing and the network transmission processing. Before the network transmission job is started, setting is performed for both the scanning processing and the network transmission processing. Thereafter, the scanner 2 starts the scanning operation at timing when the job start button 32 is pressed.

As described above, in a case where the job is executed in response to the execution instruction of the job including execution of scanning via the operation unit, handling of the document is time-consuming and inefficient. The user therefore waits for a long time near the image processing apparatus until the end of the execution of the job. To solve the above-described issues, the following processing is executed.

Figure 3:
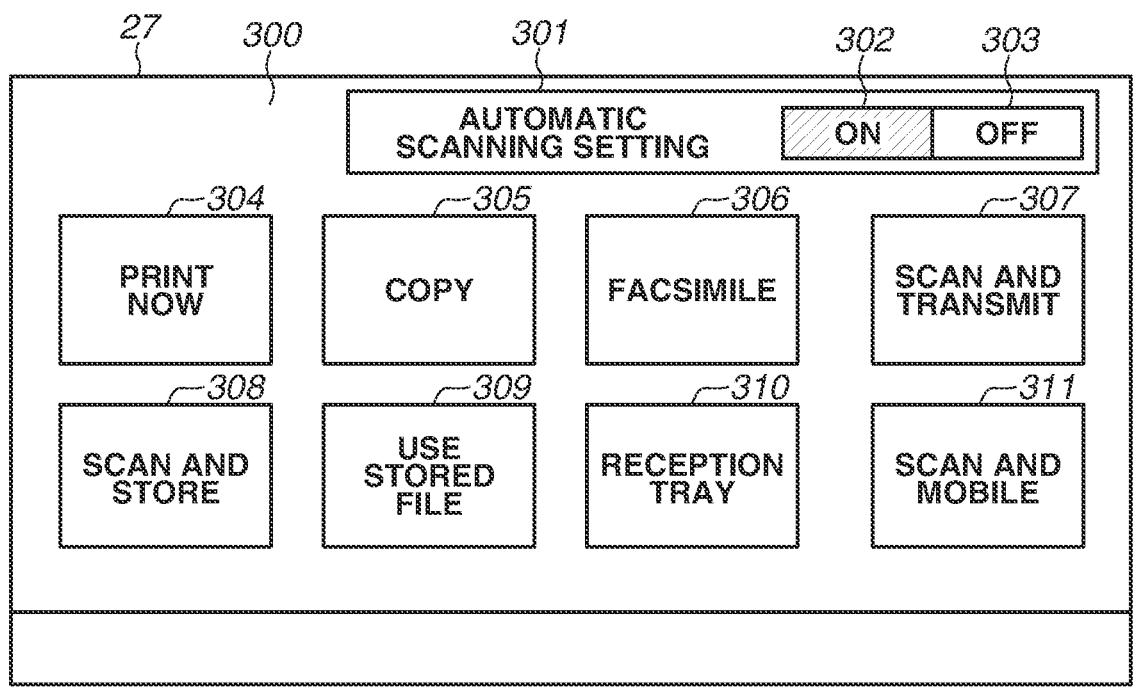
FIG. 3 is a diagram illustrating an example of a home screen displayed on an operation panel.

FIG. 3 is a diagram illustrating an example of a home screen 300 displayed on the operation panel 27. The home screen 300 is automatically displayed when the MFP 8 is turned on. In the home screen 300, buttons for displaying a screen to set and execute a plurality of functions are displayed. In addition to the buttons displayed in FIG. 3, a page in which buttons of other functions are displayed can be displayed through flick operation performed on the operation panel 27.

An area 301 is an area where automatic scanning setting is performed. In the area 301, it is possible to set whether to perform "automatic scanning" in which a document is automatically scanned without pressing of the job start button 32 or the job start button 28 performed by the user. When an ON button 302 is selected, execution of the automatic scanning is set. When an OFF button 303 is selected, non-execution of the automatic scanning is set. In the home screen 300 illustrated in FIG. 3, the ON button 302 is selected, and execution of the automatic scanning is set.

A print now button 304 is a button to display a list of print data received from the PC 9, and to instruct execution of the printing processing in which an image is printed on a sheet based on selected print data.

A copy button 305 is a button to perform setting and execution instruction of copying processing in which an image is printed on a sheet based on the image data generated by the scanner 2 through reading of the document image.

A facsimile button 306 is a button to perform setting and execution instruction of facsimile processing in which the image data generated by the scanner 2 through reading of the document image is transmitted to an external apparatus through facsimile communication. In the facsimile communication, the MFP 8 is connected to a public line (e.g., public switched telephone network (PSTN)) through an incorporated modem or network control unit (NCU) (not illustrated), and the MFP 8 transmits the image data.

A scan and transmit button 307 is a button to perform setting and execution instruction of transmission processing in which the image data generated by the scanner 2 through reading of the document image is transmitted to an external apparatus, such as the PC 9, via a network. The communication via the network is communication, such as mail transmission using simple mail transfer protocol (SMTP)

and file transmission using file transfer protocol (FTP) or server message block (SMB).

A scan and store button 308 is a button to perform setting and execution instruction of so-called BOX storage processing in which the image data generated by the scanner 2 through reading of the document image is stored in a predetermined area of the HDD 24 so as to be referred by the user later through the operation panel 27.

A use stored file button 309 is a button to perform setting and execution instruction of processing in which the image data stored in the HDD 24 in the BOX storage processing is displayed on the operation panel 27 or transmitted to an external apparatus, or an image is printed on a sheet based on the image data.

A reception tray button 310 is a button to perform setting and execution instruction of processing in which the image data received by the MFP 8 from the external apparatus through the facsimile communication, internet facsimile (I-FAX) communication, or other communication is displayed or printed.

A scan and mobile button 311 is a button to perform setting and execution instruction of transmission processing in which the image data generated by the scanner 2 through reading of the document image is transmitted to a mobile terminal communicating with the MFP 8.

Figure 4:
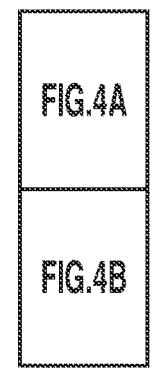
FIG. 4, that is composed of FIGS. 4A and 4B, is a flowchart illustrating an example of automatic scanning processing.
Figure 4A:
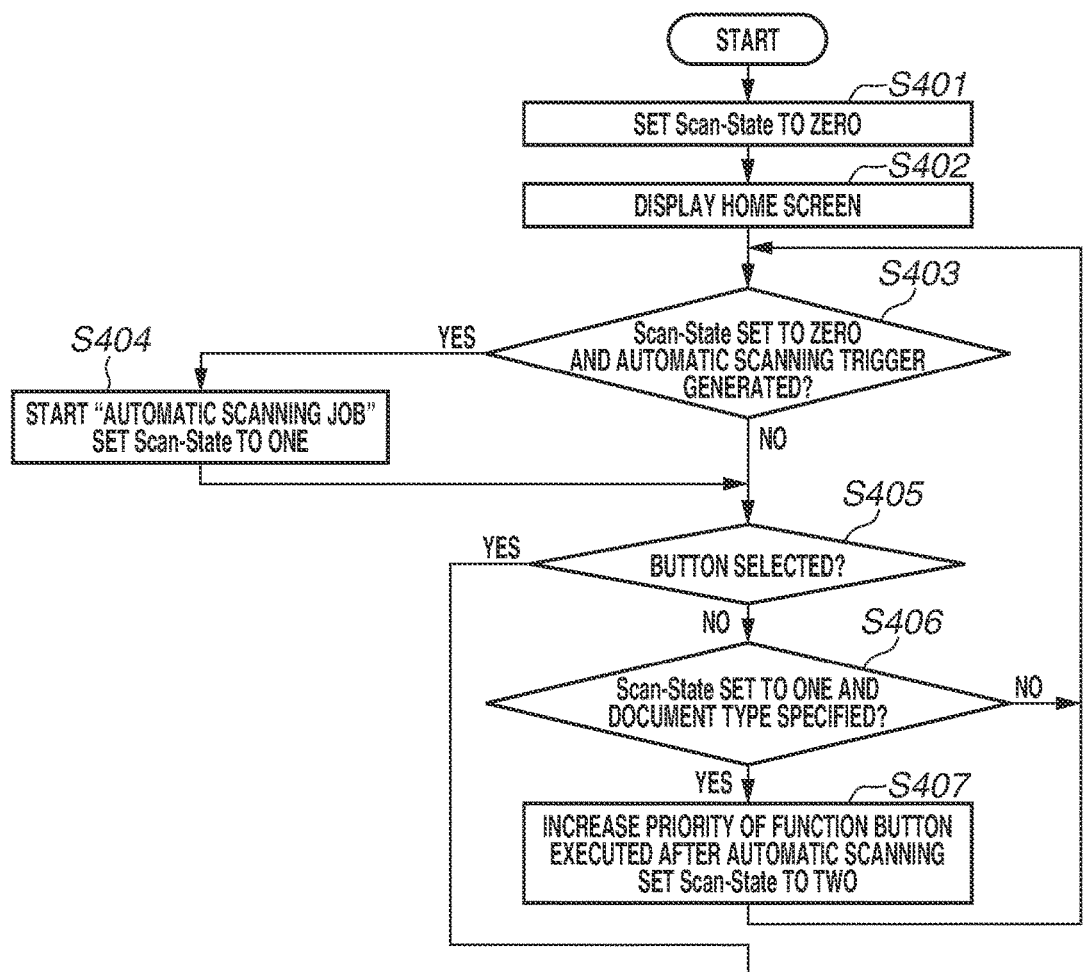
Figure 4B:
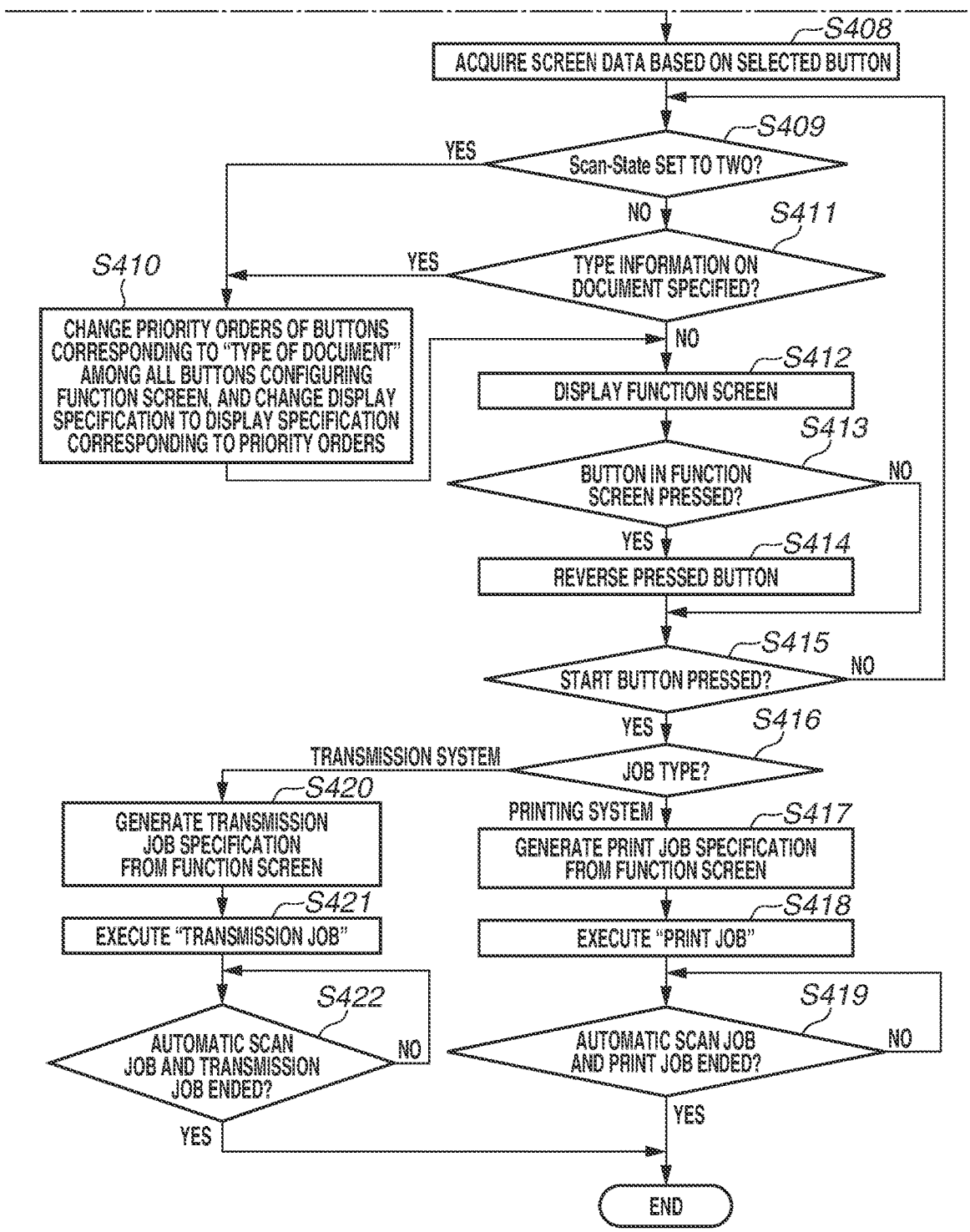

FIG. 4, composed of FIGS. 4A and 4B, is a flowchart illustrating an example of the automatic scanning processing. The processing flow illustrated in FIGS. 4A and 4B is realized when the CPU 21 reads out a program stored in the ROM 25 to the RAM 22 and executes the program. The processing flow illustrated in FIGS. 4A and 4B is started when the MFP 8 is turned on.

Figure 8:
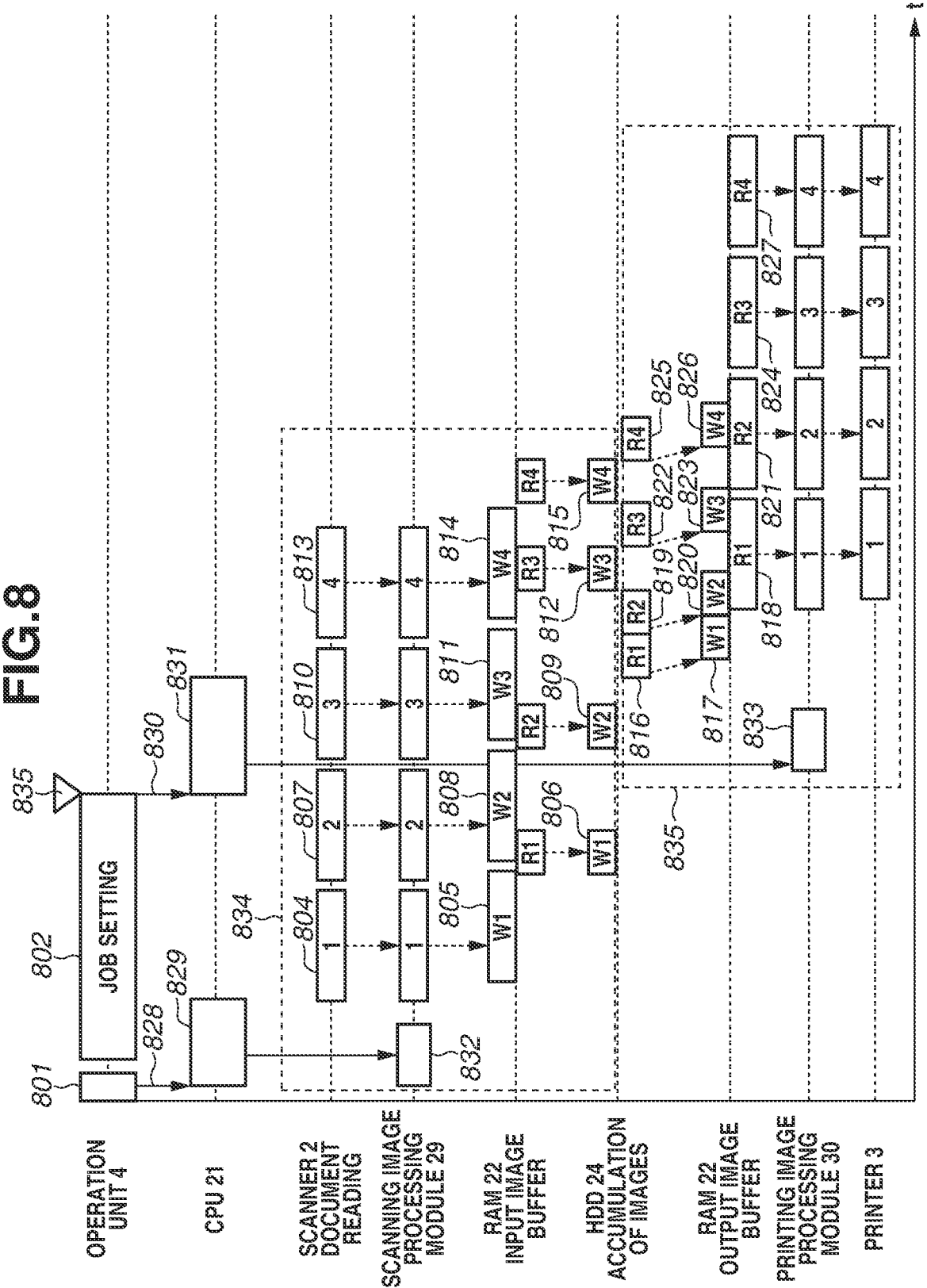
FIG. 8 is a diagram illustrating an example of a timing chart of the automatic scanning processing and printing processing.

FIG. 8 is a diagram illustrating an example of a timing chart of the automatic scanning processing and the printing processing. The horizontal axis t represents a time, and the time elapses rightward. Numbers 1, 2, 3, and 4 illustrated in squares are consecutive identifications (IDs) imparted to the images. R and W illustrated in a square mean reading and writing, respectively.

In a case where "W1" is written in a square, the square means that writing of an image having an ID of 1 has been performed in a corresponding device. In a case where "R1" is written in a square, the square means that reading of the image having the ID of 1 has been performed in the corresponding device.

A square written with "1" in a row of document reading by the scanner 2 means that the document having the image ID of 1 is scanned. The scanned document is printed and output at timing of a square written with "1" in a row of the printer 3. The following processing flow is also described with reference to the timing chart illustrated in FIG. 8.

In step S401, the CPU 21 sets (initializes) a value of a variable Scan-State to zero. In step S402, the CPU 21 displays the home screen 300 on the operation panel 27.

In step S403, the CPU 21 determines whether the variable Scan-State is zero and a trigger (801) of the automatic scanning has been generated. More specifically, in a case where the variable Scan-State is zero, the automatic scanning has been set to ON, and a predetermined time has elapsed after a document is placed on the document tray of the ADF 10, the CPU 21 determines that the trigger for the automatic scanning has been generated (828). Otherwise, the CPU 21 determines that the trigger for the automatic scanning has not been generated. The trigger for the automatic scanning is not limited thereto. For example, the trigger for the automatic scanning may be selection of an automatic scanning execution start button (not illustrated) in a state where the automatic scanning has been set to ON and the document is placed on the document tray of the ADF 10. The automatic scanning execution start button can be a button similar to the job start button 32 or the job start button 28. Alternatively, the trigger for the automatic scanning may be substituted by a selection of the job start button 32 or the job start button 28 regardless of ON/OFF of the automatic scanning.

In a case where it is determined in step S403 that the variable Scan-State is zero and the trigger for the automatic scanning has been generated (YES in step S403), the processing proceeds to step S404. Otherwise (NO in step S403), the processing proceeds to step S405.

In step S404, the CPU 21 starts execution of an automatic scan job (834). The CPU 21 sets the variable Scan-State to one. In step S405, the CPU 21 determines whether any of the buttons 304 to 311 in the home screen 300 and the buttons of the other pages has been selected via the operation panel 27. If it is determined that any of the buttons has been selected (YES in step S405), the processing proceeds to step S408 (FIG. 4B). Otherwise (NO in step S405), the processing proceeds to step S406. Although display positions of the buttons are changed in step S407, the processing in step S405 is processing to determine whether any of the buttons included in the whole of the home screen has been selected, and therefore, the operation is not changed.

Figure 9:
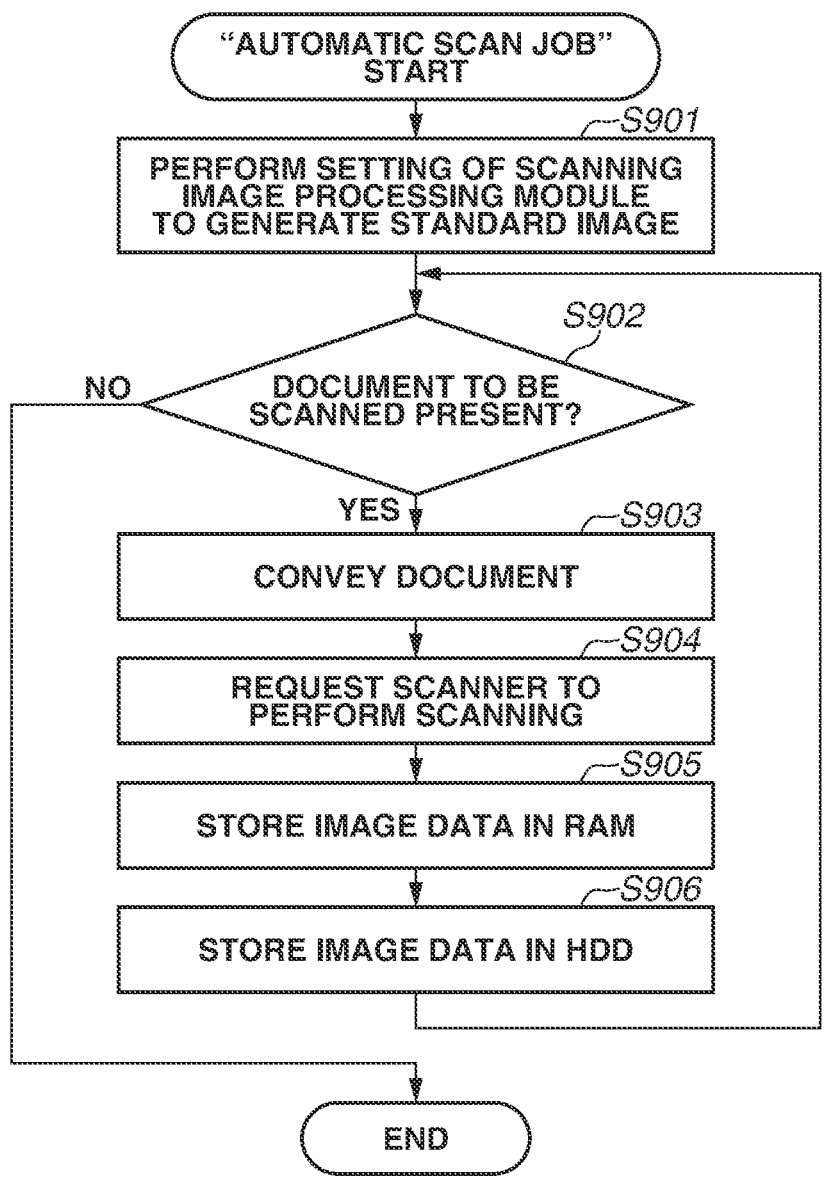
FIG. 9 is a flowchart illustrating an example of the automatic scanning processing.

Details of execution of the automatic scanning in step S404 will now be described with reference to FIG. 9. FIG. 9 is a flowchart illustrating an example of the automatic scanning processing. The processing flow illustrated in FIG. 9 is realized when the CPU 21 reads out a program stored in the ROM 25 to the RAM 22 and executes the program. In addition, the processing flow illustrated in FIG. 9 is started when it is determined in step S403 that the variable Scan-State is zero and the trigger for the automatic scanning has been generated.

In step S901, the CPU 21 controls the image processing module for scanning 29 to perform setting such that the image data generated by scanning becomes a standard image. In the automatic scanning, the scanned image data is made to be usable in various kinds of things afterward. For example, the image is constantly set to a color image because it is not known whether the image is processed in monochrome, the resolution is set to the highest resolution, and double-sided reading is constantly set because it is not known whether a rear surface is used (832).

In step S902, the CPU 21 controls the scanner 2 to determine whether a document placed on the ADF 10 is present. In a case where it is determined that the document is present (YES in step S902), the processing proceeds to step S905. Otherwise (NO in step S902), the processing ends.

In step S903, the CPU 21 controls the scanner 2 to convey the document placed on the ADF 10.

In step S904, the CPU 21 requests the scanner 2 to perform scanning processing in which the image of the document conveyed from the ADF 10 is read to generate image data, and controls the scanner 2 to generate image data (804).

In step S905, the CPU 21 stores the image data generated in step S904 in the RAM 22 (805). In step S906, the CPU 21 stores the image data stored in the RAM 22 in step S905, in the HDD 24 (806).

Referring back to the processing flow in FIGS. 4A and 4B, in step S406, the CPU 21 determines whether the variable Scan-State is one and a type of the document has been specified. The detail of specification of the type of the document will be described below. In a case where it is determined that the variable Scan-State is one and the type of the document has been specified (YES in step S406), the processing proceeds to step S407. Otherwise (NO in step S406), the processing returns to step S403.

In step S407, the CPU 21 displays, on the operation panel 27, a screen in which priority orders of the buttons to be displayed on the home screen 300 have been changed based on the type of the document specified in step S406. In the home screen 300, the buttons 304 to 311 are displayed. Likewise, buttons to perform setting and execution of functions are also displayed in other pages. Since the MFP 8 executes the automatic scanning, it is likely that a function to perform output or storage based on the scanned image data is selected. Thus, the buttons of the functions likely to be selected are displayed in the order of priority on the home screen. Alternatively, buttons of the functions unlikely to be selected may not be displayed on the home screen. In the processing performed in step S407, the variable Scan-State is set to two.

Figure 5:
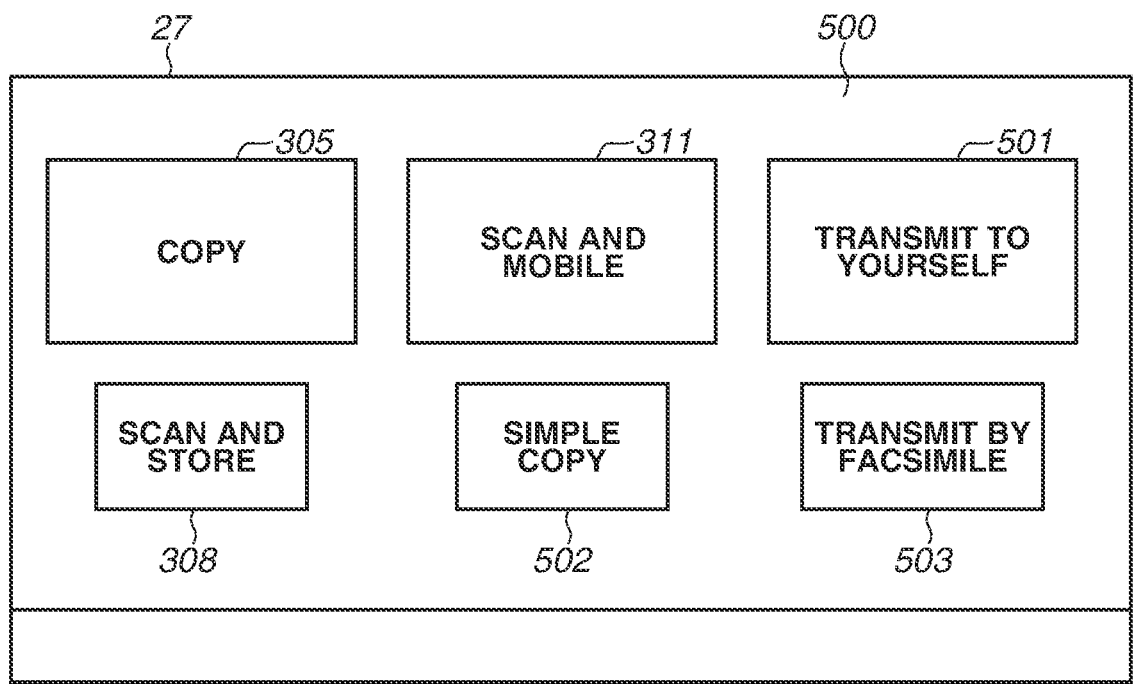
FIG. 5 is a diagram illustrating an example of a home screen displayed on an operation panel.

Processing to increase priority of a button will now be described in detail with reference to FIG. 5. FIG. 5 is a diagram illustrating an example of a home screen 500 displayed on the operation panel 27. The home screen 500 is a screen after the priority is changed from the home screen 300 illustrated in FIG. 3.

The home screen 500 includes the following buttons: a copy button 305, a scan and mobile button 311, a transmit to yourself button 501, the scan and store button 308, a simple copy button 502, and a transmit by facsimile button 503.

If the automatic scanning is executed, it is likely that the user performs output based on the image data generated by scanning Thus, buttons to perform output processing based on the image data generated by scanning are displayed on a priority basis. In FIG. 5, the copy button 305 is displayed in the home screen 500. The copy button 305 performs setting and execution of a copy function in which an image is printed on a sheet based on the image data generated by scanning. The scan and mobile button 311 is also displayed in the home screen 500. The scan and mobile button 311 performs setting and execution of a mobile transmission function in which the image data generated by scanning is transmitted to an external mobile terminal via a network. The transmit to yourself button 501 is also displayed in the home screen 500. The transmit to yourself button 501 transmits the image data generated by scanning, to an own mail address previously registered. The function is executable when the user logs in the MFP 8.

In the home screen 500, the scan and store button 308 is displayed. The scan and store button 308 performs setting and execution of so-called BOX storage processing in which the image data generated by scanning is stored in a predetermined area of the HDD 24 so as to be referred by the user via the operation panel 27 afterwards. A name of the scan and store button 308 displayed in the home screen 500 may be "store" because the scanning has been already performed.

In the home screen 500, the simple copy button 502 is displayed. The simple copy button 502 performs simple setting and execution instruction of a copy function in which an image is printed on a sheet based on the image data generated by scanning Further, in the home screen 500, the transmit by facsimile button 503 is displayed. The transmit by facsimile button 503 performs setting and execution instruction of a facsimile function in which the image data generated by scanning is transmitted by facsimile.

Among the buttons displayed in the home screen 500, the buttons likely to be selected by the user, such as the buttons 305, 311, and 501, are largely displayed as compared with the buttons 308, 502, and 503, and are conspicuous and easily selectable by the user.

Although these six buttons described above are displayed in the home screen 500, other buttons are displayed when a page is changed. In other words, the home screen 500 is a top screen, and the user can select a button without changing the page.

As described above, the buttons of the functions likely to be selected by the user after scanning can be displayed on a priority basis, thereby making it possible to improve convenience for the user.

In step S408, the CPU 21 acquires screen data corresponding to the button determined as being selected in step S405, from the HDD 24, and stores the screen data in the RAM 22.

In step S409, the CPU 21 determines whether the variable Scan-State is two. If it is determined that the variable Scan-State is two (YES in step S409), the processing proceeds to step S410. Otherwise, namely, in a case where the variable Scan-State is zero or one (NO in step S409), the processing proceeds to step S411.

In step S410, the CPU 21 changes the screen data acquired in step S408 to screen data based on the type of the document, and stores the changed screen data in the RAM 22.

Figure 6:
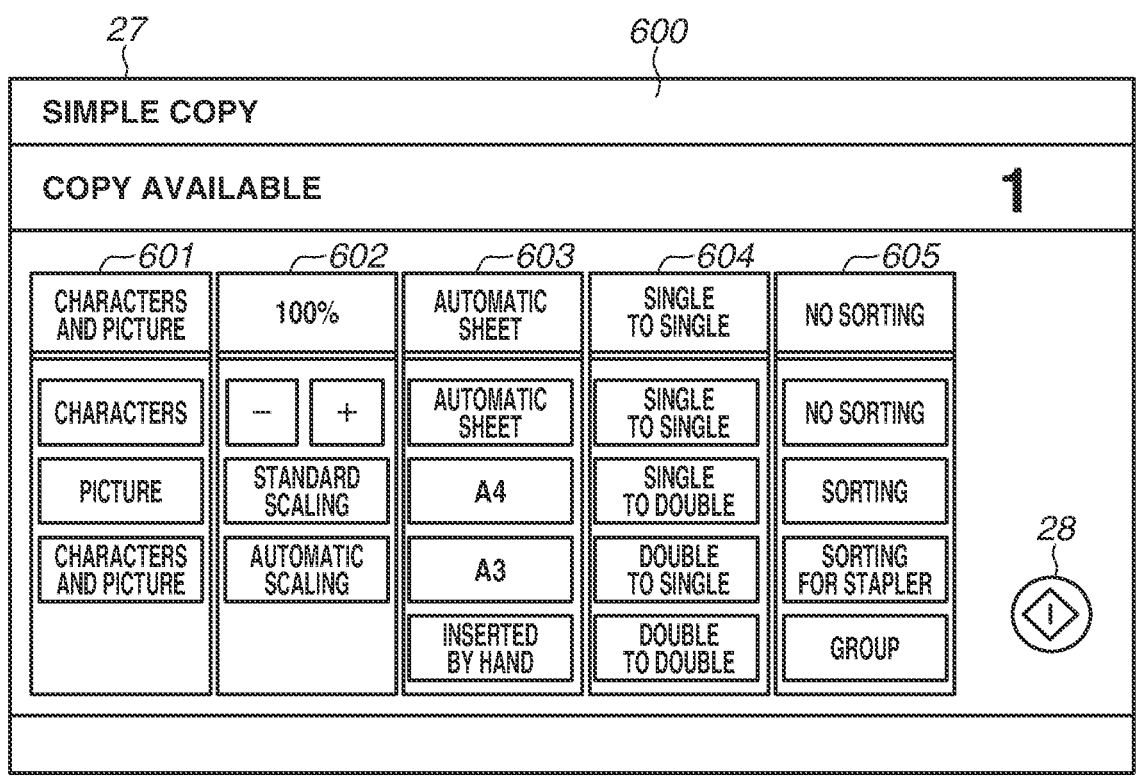
FIG. 6 is a diagram illustrating an example of a setting screen of a simple copy function.

An example in which the screen data is changed to the screen data based on the type of the document will be described with reference to FIGS. 6 and 7. FIG. 6 is a diagram illustrating an example of a setting screen of the simple copy function. A setting screen 600 illustrated in FIG. 6 is a screen displayed on the operation panel 27 in response to selection of the simple copy button 502 while the automatic scanning is not performed.

In the setting screen 600, the following settings are displayed: document type setting 601, scaling setting 602, sheet size setting 603, single-sided/double-sided setting 604, and sorting setting 605.

The document type setting 601 represents setting for selecting a type of an image on the document. The user can select a type from the following types: "characters" representing only characters, "picture" representing only a picture, and "characters and picture" representing combination of characters and a picture. Depending on the setting, setting and parameters for the image processing performed by the image processing module for scanning 29 are changed.

The scaling setting 602 represent s setting for changing a size of the image data generated by scanning. A percentage can be changed with "+" and "−" buttons, or the size can be changed to a regular size, such as A4 size and A3 size.

The sheet size setting 603 represents setting for setting a size of a sheet on which the image is printed. The user can select a size from the following sizes: "automatic sheet" for adjusting the size of the sheet according to the size of the document detected by a detection sensor or the like, and a regular size, such as A4 and A3 size.

The single-sided/double-sided setting 604 represents setting for selecting whether to print the image on one side or both sides of a sheet. "Single to single" is setting to scan a document in which an image is formed on one side, and to print the image on one side of the sheet. "Single to double" represents setting for scanning a document in which an image is formed on one side, and for printing the image on both sides of a sheet. "Double to single" represents setting for scanning a document in which images are formed on both sides, and for printing the images on one side of a sheet. "Double to double" represents setting for scanning a document in which images are formed on both sides, and for printing the images on both sides of a sheet. The user can select setting from "single to single", "single to double", "double to single", and "double to double".

The sorting setting 605 represents setting for setting whether the printing is performed for each copy or for each page when printing of a plurality of copies is set.

When the setting is received on the setting screen 600, and the job start button 28 or the job start button 32 is selected, copy is executed.

Figure 7:
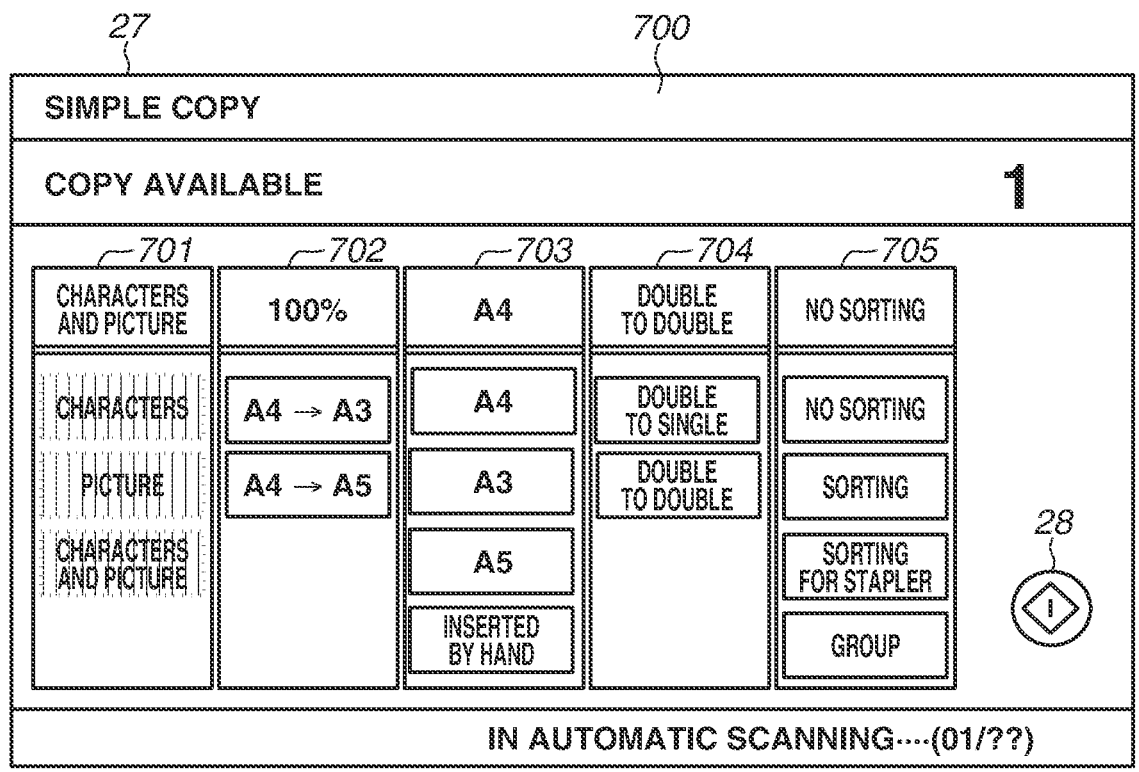
FIG. 7 is a diagram illustrating an example of a setting screen displayed while the automatic scanning processing is executed.

FIG. 7 is a diagram illustrating an example of a setting screen 700 displayed while the automatic scanning is executed. The setting screen 700 illustrated in FIG. 7 is displayed in response to selection of the simple copy button 502 in the home screen 500 in FIG. 5 while the automatic scanning is executed.

In the present exemplary embodiment, the description is given on an assumption that the documents scanned by the automatic scanning each have an "A4 size", "the first sheet is a color document", and "double-sided document".

Since there is a possibility that the image data has been already generated by the automatic scanning, document type setting 701 is in an unselectable state so as not to change the image processing in one job. In the unselectable state, the button may be grayed out or may not be displayed. If the image processing is performed after generation of the image data (e.g., before execution of the printing processing), the document type setting 701 may be selectable. In the present exemplary embodiment, the image processing is performed with predetermined standard settings (832).

Since at least the first sheet of the document is determined to have A4 size in scaling setting 702, only setting to change the size from A4 size to other sizes is displayed, and thereby preventing the user from being confused about settings, accordingly.

In sheet size setting 703, "automatic sheet" is not displayed. This is because the size of the document has been specified by the automatic scanning Since a sheet having an output size same as the size of the document currently being scanned is found, A4 size is displayed in a selected state.

In single-sided/double-sided setting 704, settings of "single to single" and "single to double" are not displayed. This is because the document has been specified to be a double-sided document by the automatic scanning. In other words, in the single-sided/double-sided setting 704, "double to double" and "double to single" are selectable.

Since no information specifiable by the automatic scanning is present, sorting setting 705 is displayed as in the setting screen 600 illustrated in FIG. 6.

Also in the setting screen 700 in FIG. 7, when the setting is performed and the job start button 28 or the job start button 32 is selected, the copy job is executed.

As described above, buttons for unnecessary settings are not displayed, and thus the user can easily find desired settings with improved conveniences.

In step S411, the CPU 21 determines whether type information on the document has been specified. More specifically, the CPU 21 determines whether information representing the type of the document is stored in the RAM 22. If it is determined that the type information has been specified (YES in step S411), the processing proceeds to step S410. Otherwise (NO in step S411), the processing proceeds to step S412. The type information on the document includes the size of the document, and information about whether the image is formed on one side or both sides of the document. The size of the document is specified based on a detection result of a size detection sensor provided in a conveyance path of the scanner 2. Whether the image is formed on one side or both sides is specified by scanning both sides of the document and detecting whether the rear surface is a blank image.

In step S412, the CPU 21 displays the function screen on the operation panel 27 based on the screen data stored in the RAM 22.

In step S413, the CPU 21 determines whether a setting button in the function screen displayed in step S412 has been selected. If it is determined that the setting button has been selected (YES in step S413), the processing proceeds to step S414. Otherwise (NO in step S413), the processing proceeds to step S415.

In step S414, the CPU 21 reverses display of the button determined as being selected in step S413, and displays a highlighted screen on the operation panel 27.

In step S415, the CPU 21 determines whether the job start button 32 or the job start button 28 has been selected. If it is determined that the job start button 32 or the job start button 28 has been selected (YES in step S415), the processing proceeds to step S416 (835). Otherwise (NO in step S415), the processing proceeds to step S409.

In step S416, the CPU 21 determines whether the function of the button determined as being selected in step S405 is related to a transmission system or a printing system. If the function is determined to be related to a transmission system (transmission system in step S416), the processing proceeds to step S420. Otherwise (printing system in step S416), the processing proceeds to step S417.

In step S417, the CPU 21 generates a specification of the print job. In step S418, the CPU 21 controls the printer 3 to execute the print job (830). The print job in this example is, for example, a copy job.

Figure 10:
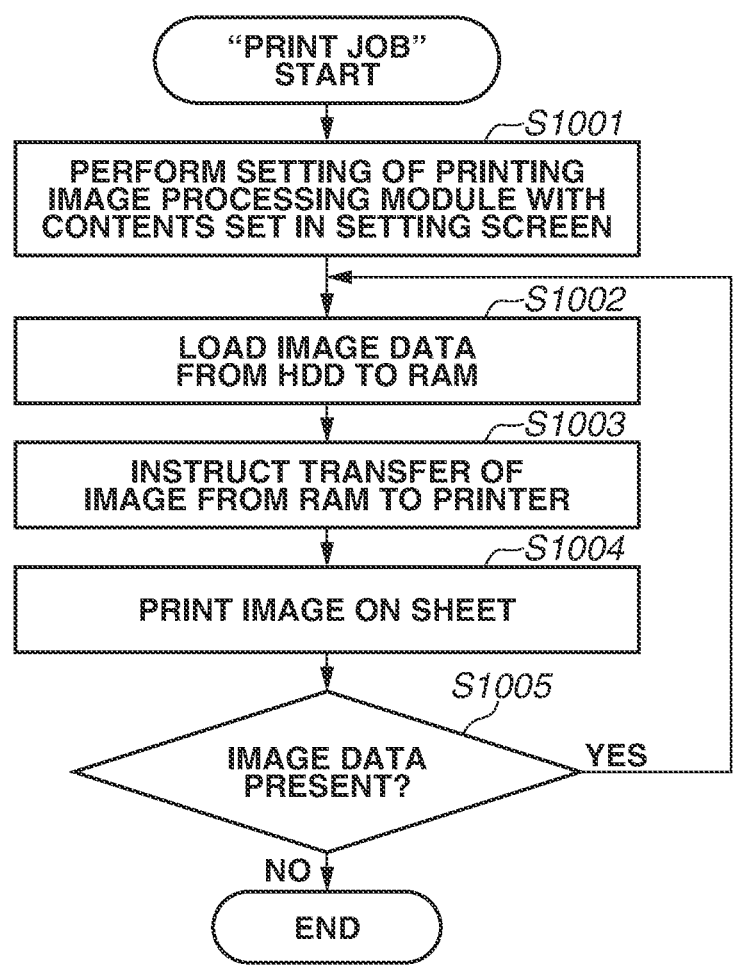
FIG. 10 is a flowchart illustrating an example of the printing processing.

The detailed processing while the print job is executed will now be described with reference to FIG. 10. FIG. 10 is a flowchart illustrating an example of the printing processing. The processing flow illustrated in FIG. 10 is realized when the CPU 21 reads out a program stored in the ROM 25 to the RAM 22 and executes the program. The processing flow illustrated in FIG. 10 is started in response to selection of the job start button in step S415.

In step S1001, the CPU 21 performs setting of the image processing module for printing 30 with the contents set in the setting screen 700 (833).

In step S1002, the CPU 21 reads out the image data stored in the HDD 24 in step S906 to the RAM 22 (816 and 817).

In step S1003, the CPU 21 issues an instruction to transfer, to the printer 3, the image data read to the RAM 22 in step S1002 (818).

In step S1004, the CPU 21 controls the printer 3 to print the image on a sheet based on the image data transferred in step S1003.

In step S1005, the CPU 21 determines whether the image data generated by scanning is stored in the HDD 24. If it is determined that the image data is stored (YES in step S1005), the processing returns to step S1002. Otherwise (NO in step S1005), the processing ends.

Referring back to FIG. 4B, in step S419, the CPU 21 determines whether the automatic scan job and the print job have ended. If it is determined that the automatic scan job and the print job have ended (YES in step S419), the processing ends. Otherwise (NO in step S419), the processing returns to step S419.

A case where the function is determined as a job related to the transmission system in step S416 will now be described. In step S420, the CPU 21 generates a specification of the transmission job. In step S421, the CPU 21 controls the LAN I/F 23 or the modem (not illustrated) to transmit the image data generated in the scan job to the outside. The transmission method may be selected in the function screen or in the home screen 300. The image data is transmitted by one or more transmission methods selected from a mail using SMTP, file transmission using SMB or FTP, and facsimile communication.

Figure 11:
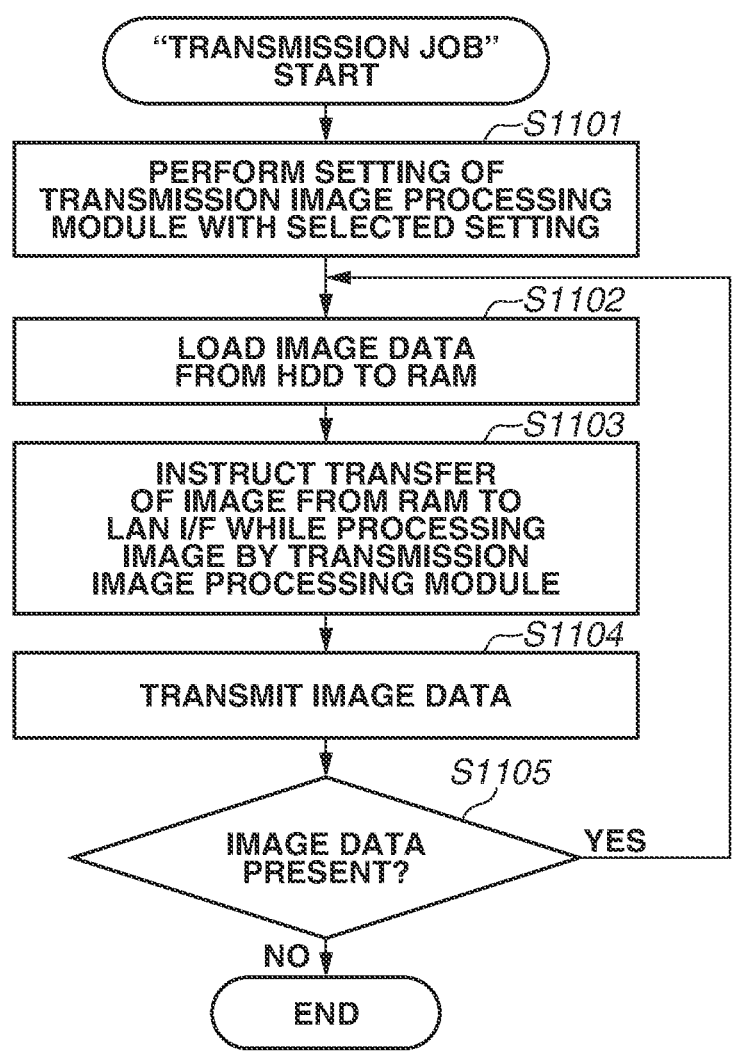
FIG. 11 is a flowchart illustrating an example of transmission processing.

The detailed processing when the transmission job is executed will now be described with reference to FIG. 11. FIG. 11 is a flowchart illustrating an example of the transmission processing. The processing flow illustrated in FIG. 11 is realized when the CPU 21 reads out a program stored in the ROM 25 to the RAM 22 and executes the program. The processing flow illustrated in FIG. 11 is started in response to selection of the job start button performed in step S415.

Figure 12:
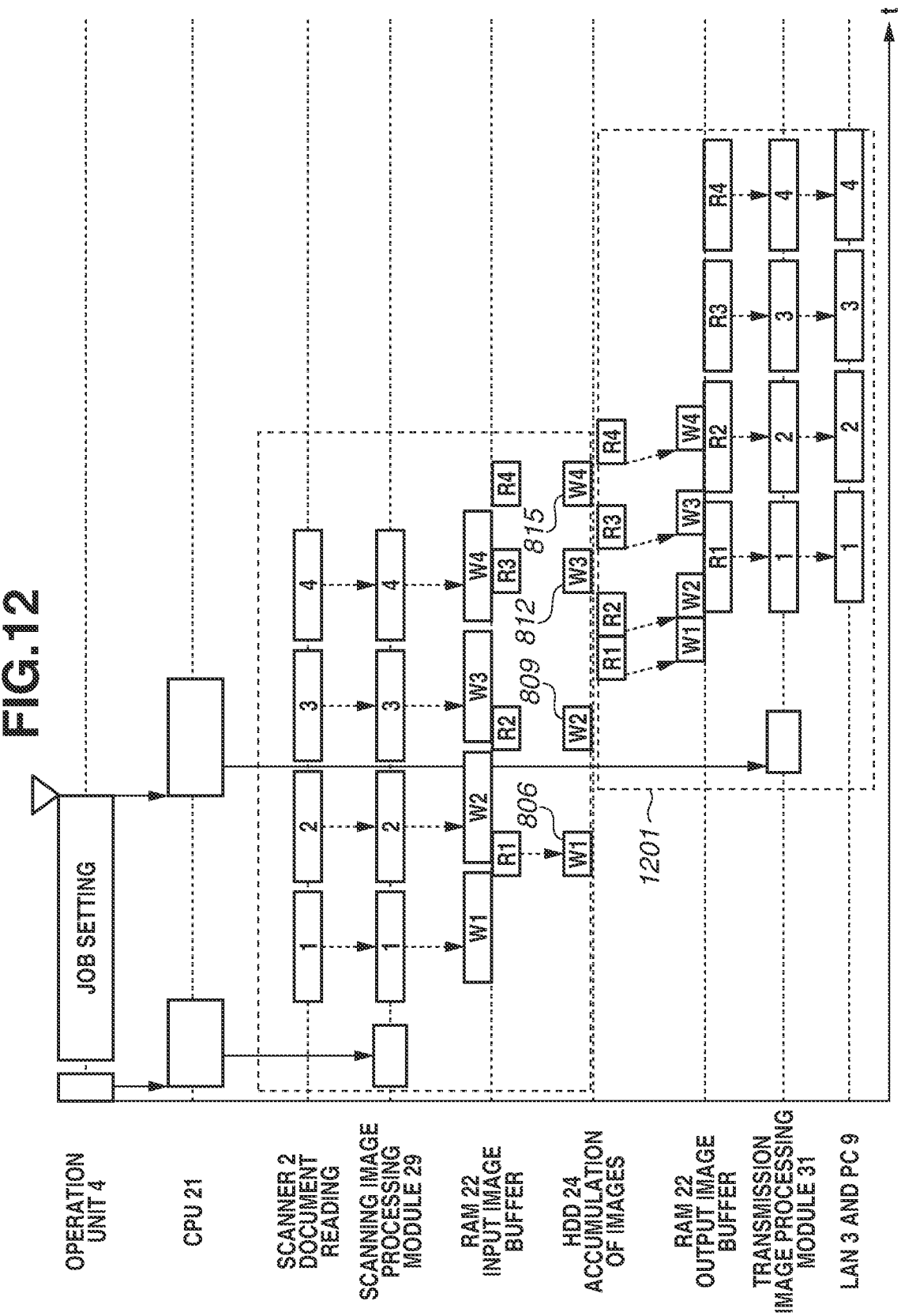
FIG. 12 is a diagram illustrating an example of a timing chart of the automatic scanning processing and the transmission processing.

The example in which print is selected after scanning has been described with reference to FIG. 8. An example in which the image data is transmitted after scanning as illustrated in the processing flow illustrated in FIG. 11 will now be described with reference to FIG. 12. FIG. 12 is a diagram illustrating an example of a timing chart of the automatic scanning processing and the transmission processing. The processing flow illustrated in FIG. 11 will be described along with the description of FIG. 12. The transmission job (1201) is executed when the following processing is performed.

In step S1101, the CPU 21 performs setting for the image processing module for transmission 31, etc. based on the setting selected in a setting screen (not illustrated). The contents set in this step include a file format converted in transmission, a destination, and a transmission resolution.

In step S1102, the CPU 21 reads out the image data stored in step S906 from the HDD 24 to the RAM 22.

In step S1103, the CPU 21 transfers the image data read out in step S1102 from the RAM 22 to the LAN I/F 23 while processing the image with the image processing module for transmission 31.

In step S1104, the CPU 21 controls the LAN I/F 23 to transmit the image data transferred to the LAN I/F 23, to the set destination.

In step S1105, the CPU 21 determines whether the image data generated by scanning is stored in the HDD 24. In a case where the image data has been stored (YES in step S1105), the processing returns to step S1102. Otherwise (NO in step S1105), the processing ends.

Referring back to FIG. 4B, in step S422, the CPU 21 determines whether the automatic scan job and the transmission job have ended. If it is determined that the automatic scan job and the transmission job have ended (YES in step S422), the processing ends. Otherwise (NO in step S422), the processing returns to step S422.

The present invention is directed to reduction of a time from the setting of the job to execution of the output job including execution of scanning at the time of performing scanning by performing the above-described processing.

The automatic scan job according to the present exemplary embodiment can be executed in parallel with the print job. The automatic scan job can be executed in parallel also with the transmission job.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-235090, filed Dec. 25, 2019, which is hereby incorporated by reference herein in its entirety.

What is claimed is:

1. An image processing apparatus, comprising:
   a scanning unit configured to perform a scanning process for scanning an image of a document and for generating image data based on the image;
   a receiving unit configured to receive selection, by a user, of an output process from a plurality of output processes for outputting the image data generated by the scanning process; and
   a controller configured to perform the selected output process for outputting the image data generated by the scanning process,
   wherein the receiving unit can receive the selection, by the user, of the output process for outputting the image data while the scanning unit performs the scanning process for scanning the image of the document and for generating the image data.

2. The image processing apparatus according to claim 1, further comprising a display unit configured to display a screen,
   wherein the display unit displays a first screen for the receiving unit to receive, before the scanning unit performs the scanning process, the selection of the output process and a second screen for the receiving unit to receive the selection of the output process while the scanning unit performs the scanning process, the first screen being different from the second screen.

3. The image processing apparatus according to claim 2, wherein a plurality of buttons for performing the plurality of output processes is larger than a button for performing another process, the plurality of buttons being displayed in the second screen.

4. The image processing apparatus according to claim 1, further comprising a document placing unit, wherein the scanning unit starts the scanning process in response to placing of the document on the document placing unit without a user instruction for performing the scanning process.

5. The image processing apparatus according to claim 1, further comprising an accepting unit configured to accept a user instruction for performing the selected output process, wherein the accepting unit accepts the user instruction while the scanning unit performs the scanning process.

6. The image processing apparatus according to claim 1, wherein a first setting screen displayed when the receiving unit receives the selection of the output process before the scanning unit performs the process is different from a second setting screen displayed when the receiving unit receives the selection of the output process while the scanning unit performs the scanning process.

7. The image processing apparatus according to claim 6, wherein the second setting screen is displayed based on information specified by the scanning process.

8. The image processing apparatus according to claim 7, wherein the information includes a size of the document.

9. The image processing apparatus according to claim 1, wherein the output process includes at least one of process for printing the image based on the image data on a sheet and process for transmitting the image data to an outside.

10. An image processing method, comprising:
  performing a scanning process for scanning an image of a document and for generating image data based on the image;
  receiving selection, by a user, of an output process from a plurality of output processes for outputting the image data generated by the scanning process; and
  performing the selected output process for outputting the image data generated by the scanning process,
  wherein the selection, by the user, of the output process for outputting the image data is able to be received while the scanning process is performed.

11. The image processing method according to claim 10, further comprising displaying a first screen or a second screen,
  wherein the first screen for receiving, before the scanning process is performed, the selection of the output process is different from the second screen for receiving the selection of the output process while the scanning process is performed.

12. The image processing method according to claim 11, wherein a plurality of buttons for performing the plurality of output processes is larger than a button for performing another process, the plurality of buttons being displayed in the second screen.

13. The image processing method according to claim 10, wherein the scanning process is started in response to placing of the document on a document placing unit.

14. The image processing method according to claim 10, further comprising accepting a user instruction for performing the selected output process, the user instruction being accepted while the scanning process is performed.

15. The image processing method according to claim 10, wherein a first setting screen displayed when the selection of the output process is received before the scanning process is performed is different from a second setting screen displayed when the selection of the output process is received while the scanning process is performed.

16. The image processing method according to claim 15, wherein the second setting screen is displayed based on information specified by the scanning process.

17. The image processing method according to claim 16, wherein the information includes a size of the document.

18. The image processing method according to claim 10, wherein the output process includes at least one of process for printing the image based on the image data on a sheet and process for transmitting the image data to an outside.

19. A non-transitory computer-readable storage medium storing a program that, when executed by a computer, causes the computer to perform a method of controlling an image processing apparatus, the method comprising:
  performing a scanning process for scanning an image of a document and for generating image data based on the image;
  receiving selection, by a user, of an output process from a plurality of output processes for outputting the image data generated by the scanning process; and
  performing the selected output process for outputting the image data generated by the scanning process,
  wherein the selection, by the user, of the output process for outputting the image data is able to be received while the scanning process is performed.

* * * * *